US012248943B2

(12) United States Patent
Smith

(10) Patent No.: US 12,248,943 B2
(45) Date of Patent: Mar. 11, 2025

(54) SYSTEM AND METHOD FOR FACILITATING GLOBAL TRADE AND SUSTAINABLE ENVIRONMENTAL AND GOVERNANCE ATTRIBUTE ATTESTATIONS

(71) Applicant: KYG Trade, INC., Newport Beach, CA (US)

(72) Inventor: Todd R. Smith, Newport Coast, CA (US)

(73) Assignee: KYG Trade, INC., Newport Beach, CA (US)

( * ) Notice: Subject to any disclaimer, the term of this patent is extended or adjusted under 35 U.S.C. 154(b) by 19 days.

(21) Appl. No.: 17/512,223

(22) Filed: Oct. 27, 2021

(65) Prior Publication Data

US 2022/0129912 A1   Apr. 28, 2022

Related U.S. Application Data

(60) Provisional application No. 63/106,351, filed on Oct. 27, 2020.

(51) Int. Cl.
  *G06Q 30/018* (2023.01)
  *G06F 18/2431* (2023.01)
  *G06Q 10/0831* (2023.01)

(52) U.S. Cl.
  CPC ....... *G06Q 30/018* (2013.01); *G06F 18/2431* (2023.01); *G06Q 10/0831* (2013.01)

(58) Field of Classification Search
  CPC .............. G06Q 30/018; G06Q 10/0831; G06F 18/2431
  See application file for complete search history.

(56) References Cited

U.S. PATENT DOCUMENTS 8,170,897 B1 * 5/2012 Cohen .................... G06Q 10/06
                                                              705/7.13
10,505,726 B1   12/2019 Andon et al.
(Continued)

FOREIGN PATENT DOCUMENTS

WO   2020068421 A1   4/2020

OTHER PUBLICATIONS

International Search Report for International application PCT/US21/56858, dated Jan. 24, 2022.
(Continued)

*Primary Examiner* — Dennis W Ruhl
(74) *Attorney, Agent, or Firm* — Quinn IP Law; Mark J Levine

(57) ABSTRACT

A global trade and SESG management system includes a processor in electronic communication with at least one data repository having product data stored thereon. The processor is configured to generate an electronic data record (EDR) corresponding to a product and store the EDR in memory associated with the processor. The EDR includes: a record identifier; summary data representative of one or more attributes of the product; and an electronic pointer identifying the location of the product data on the data repository. The processor is further configured to determine a regulatory categorization for the product and a confidence value for the regulatory categorization. The regulatory categorization is determined from at least one of the summary data or the product data. The confidence value is indicative of a probability that the determined regulatory categorization is a most optimal categorization.

25 Claims, 7 Drawing Sheets

(56) References Cited

U.S. PATENT DOCUMENTS

| | | | |
|---|---|---|---|
| 10,664,797 B2 | 5/2020 | Chappell et al. | |
| 2005/0119926 A1* | 6/2005 | Turetsky | G06Q 10/0831 |
| | | | 705/331 |
| 2006/0080347 A1* | 4/2006 | Potts | G06Q 10/087 |
| 2008/0091577 A1* | 4/2008 | Holmes | G06Q 10/10 |
| | | | 705/30 |
| 2013/0030967 A1* | 1/2013 | Prasad | G06Q 10/10 |
| | | | 705/37 |
| 2017/0220666 A1 | 8/2017 | Summerlin et al. | |
| 2017/0247000 A1 | 8/2017 | Ricci | |
| 2018/0225448 A1 | 8/2018 | Russinovich et al. | |
| 2018/0341910 A1* | 11/2018 | Broveleit | G06Q 30/018 |
| 2019/0108482 A1 | 4/2019 | Vikas et al. | |
| 2019/0164118 A1 | 5/2019 | Sandberg et al. | |
| 2019/0253422 A1 | 8/2019 | Treat et al. | |
| 2019/0287200 A1 | 9/2019 | Schuler et al. | |
| 2019/0303951 A1 | 10/2019 | Bakalis | |
| 2020/0118068 A1* | 4/2020 | Turetsky | G06Q 10/0831 |
| 2020/0286045 A1* | 9/2020 | Ripley | G06Q 10/30 |
| 2020/0364725 A1* | 11/2020 | Hoehne | G06Q 30/018 |

OTHER PUBLICATIONS

International Search Report for International application PCT/US2021056858, dated Feb. 16, 2024.

\* cited by examiner

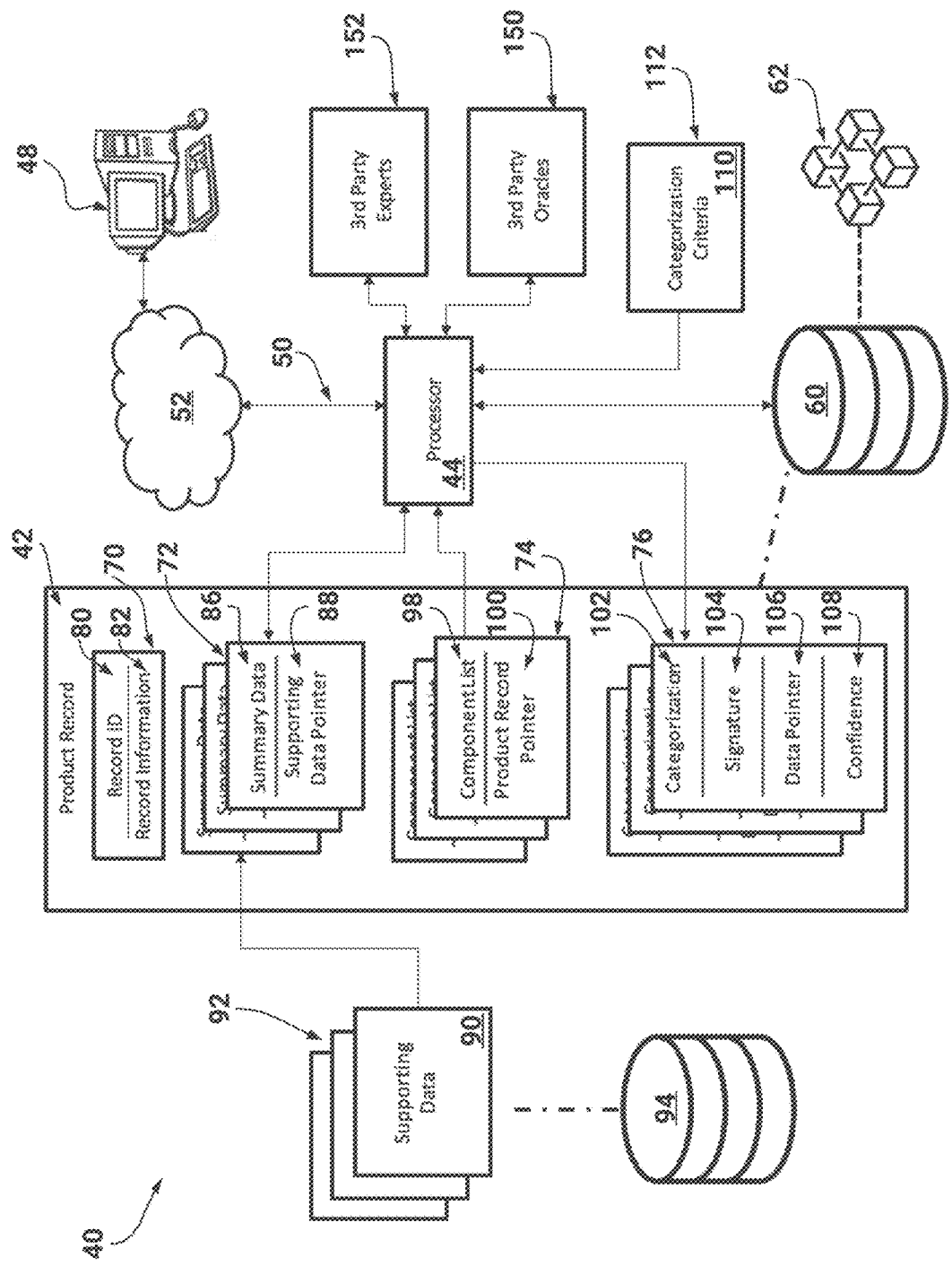
FIG. 2 - Attestation System

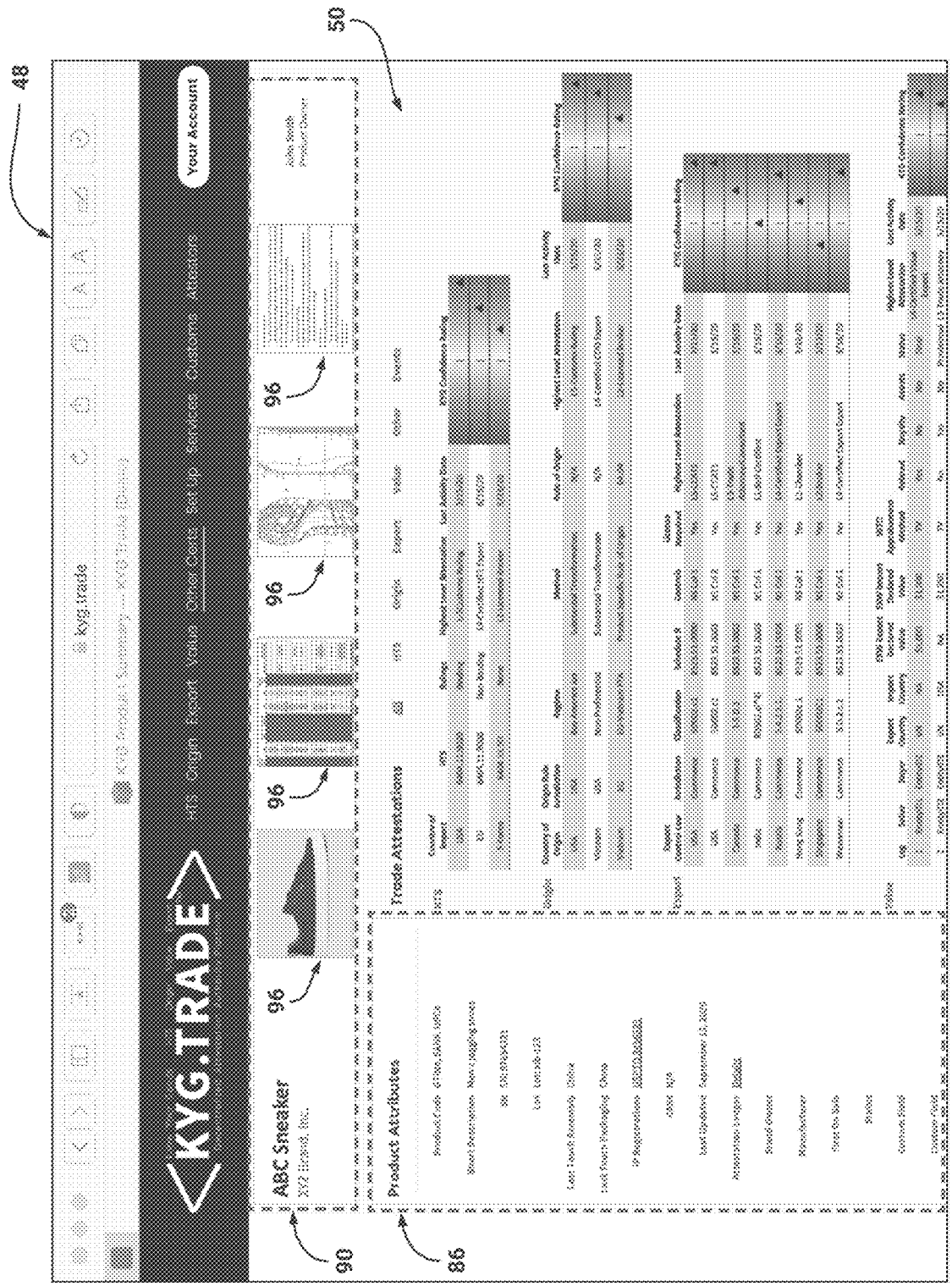
FIG. 3 - Portions of EDR

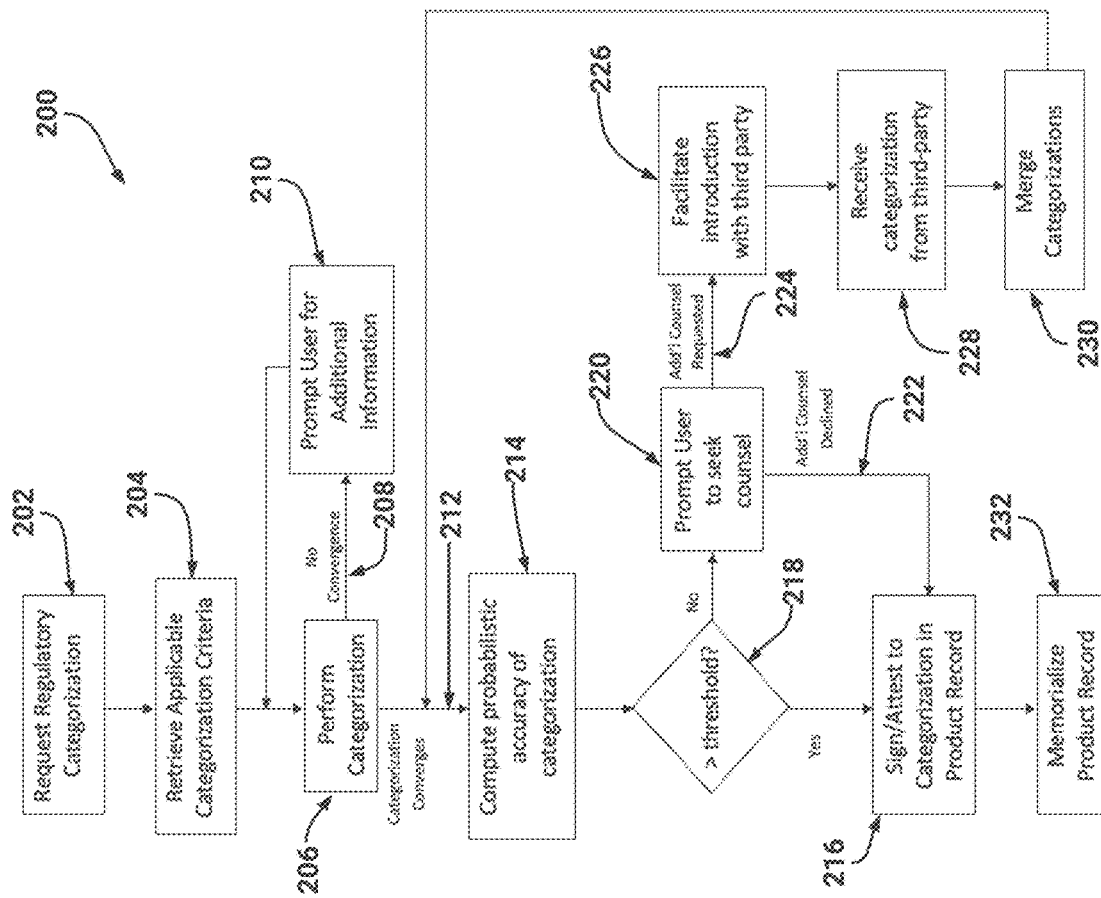
FIG. 4 - Regulatory Categorization

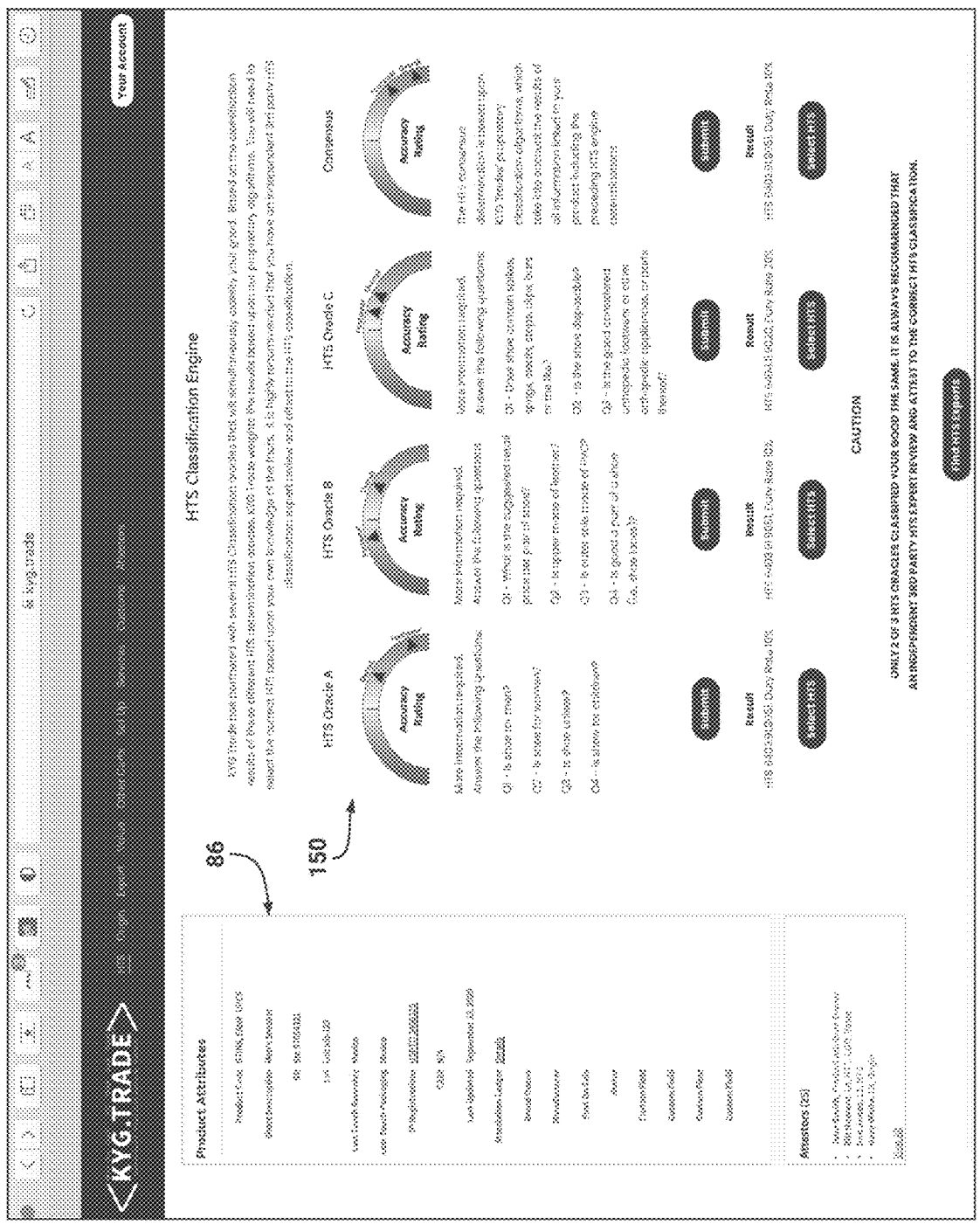
FIG. 5 - Oracles

FIG. 6 - Experts

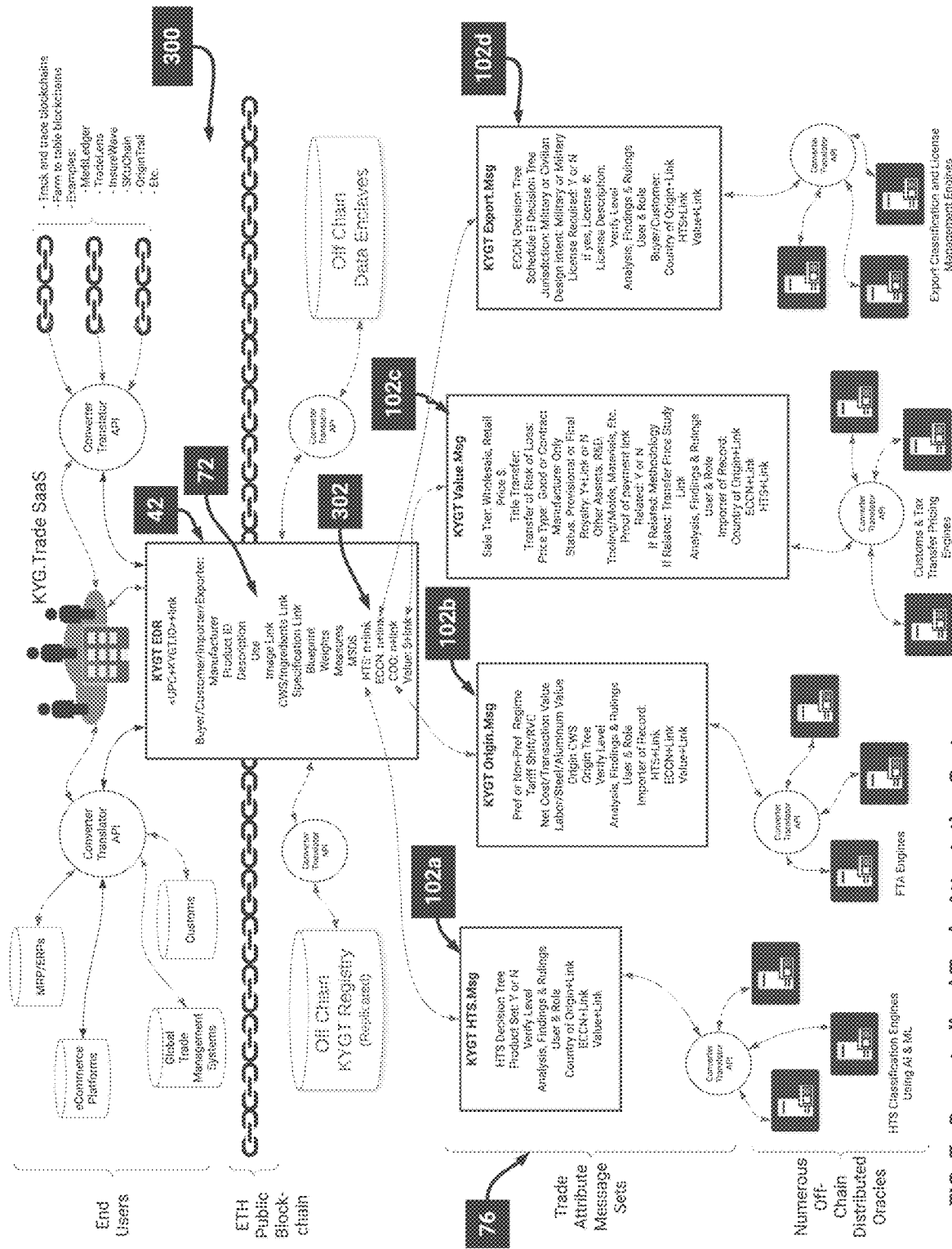
FIG. 7 - Decentralized Trade Attestation System

US 12,248,943 B2

SYSTEM AND METHOD FOR FACILITATING GLOBAL TRADE AND SUSTAINABLE ENVIRONMENTAL AND GOVERNANCE ATTRIBUTE ATTESTATIONS

CROSS REFERENCE TO RELATED APPLICATIONS

The present application claims the benefit of priority from U.S. Provisional Patent Application No. 63/106,351, filed 27 Oct. 2020, which is incorporated by reference in its entirety and for all that it discloses.

TECHNICAL FIELD

The present disclosure relates generally to a computerized system and method for improving trust and document accessibility in global tax, trade and SESG management applications. In particular, the present disclosure utilizes a hierarchy of blockchain and/or distributed ledger technology to provide on-demand access to global trade and SESG documentation and attestations.

BACKGROUND

In today's global economy, it is common for the manufacture of goods to stretch across multiple countries/geopolitical boundaries. For example, stock materials may be sourced from a first country, these materials may be manufactured into a component in a second country, assembled into a final product in a third country, and sold to a consumer or end user in a fourth country. Each country in this chain may have its own system of laws and regulations that govern the cross-border movement of goods and may further set forth taxes, tariffs or duties that are owed to each governmental entity.

Ensuring compliance with each country's regulations is a complex undertaking that requires complete documentation of the product, its manufacturing process, as well as a thorough understanding of each country's complex import and export legal and regulatory framework. Many times, however, this process is complicated by consistently changing regulations and free trade agreements as well as by the distributed nature and varying forms of product-specific documentation.

In some instances, extended/detailed product documentation may only be provided upon request and/or following the initiation of a SESG or customs audit. Once requested, there can be significant time delays before documentation is generated and returned. These delays can slow down the customs border clearance process and the post-clearance customs audit process and result in the importer or exporter incurring considerable time and expense.

Regarding the regulations themselves, many times there can be ambiguity as to which regulation governs for a specific product. For example, the Harmonized Tariff Schedule of the United States has 99 chapters, of which there are 33 pages of tariff classifications and duty rates solely relating to "Vehicles other than railway or tramway rolling stock, and parts and accessories thereof." There may be a chance that a product could fit into multiple classifications, or else not fit neatly into any of the classifications, in which case, only a professional with expertise in those goods may be suited to make the determination.

To further complicate matters, every country may have its own tariff schedule—possibly in its own native language—and groups of countries may also have trade agreements that can supersede the tariff schedules depending on the origin of the good. Under such trade agreements, additional SESG and rules of origin are likely set forth, which would require further documentation regarding the components and attributes that comprise a good, its supply chain and value of the imported item.

The level of redundancy and duplication of effort is profound. For example, under Section 484 of the Tariff Act, as amended (19 U.S.C. § 1484), the importer of record (IOR) is responsible for using reasonable care to enter, classify and determine the value of imported merchandise and to provide any other information necessary to enable Customs and Border Protection (CBP) to properly assess duties, collect accurate statistics, and determine whether other applicable legal requirements, if any, have been met. In practice, every IOR of the same good either employs trained personnel or engages outside experts to gather the same product attribute documentation, conduct research, and make a determination of the most optimal/appropriate categorization. The CBP regulations require the IOR to maintain the documentation and findings in a record keeping system for five (5) years. The present technology eliminates the duplicative administratively burdensome data gathering and analysis process that each IOR of the same product goes through to demonstrate reasonable care by making the good's attribute source documents and categorization determinations accessible to multiple stakeholders, including tax, customs and other government authorities.

BRIEF DESCRIPTION OF THE DRAWINGS

FIG. 2 is a schematic diagram of an embodiment of a global trade and SESG management system.

FIG. 3 is a schematic illustration of a hosted user interface showing portions of an electronic product data record.

FIG. 4 is a schematic diagram illustrating a method of determining a regulatory categorization for a product.

FIG. 5 is a schematic diagram of a hosted user interface providing a plurality of third-party oracles for consultation on the regulatory categorization.

FIG. 6 is a schematic diagram of a hosted user interface providing a plurality of third-party experts for consultation on the regulatory categorization.

FIG. 7 is a schematic diagram of an embodiment of a global trade and SESG management system.

Figure 1:
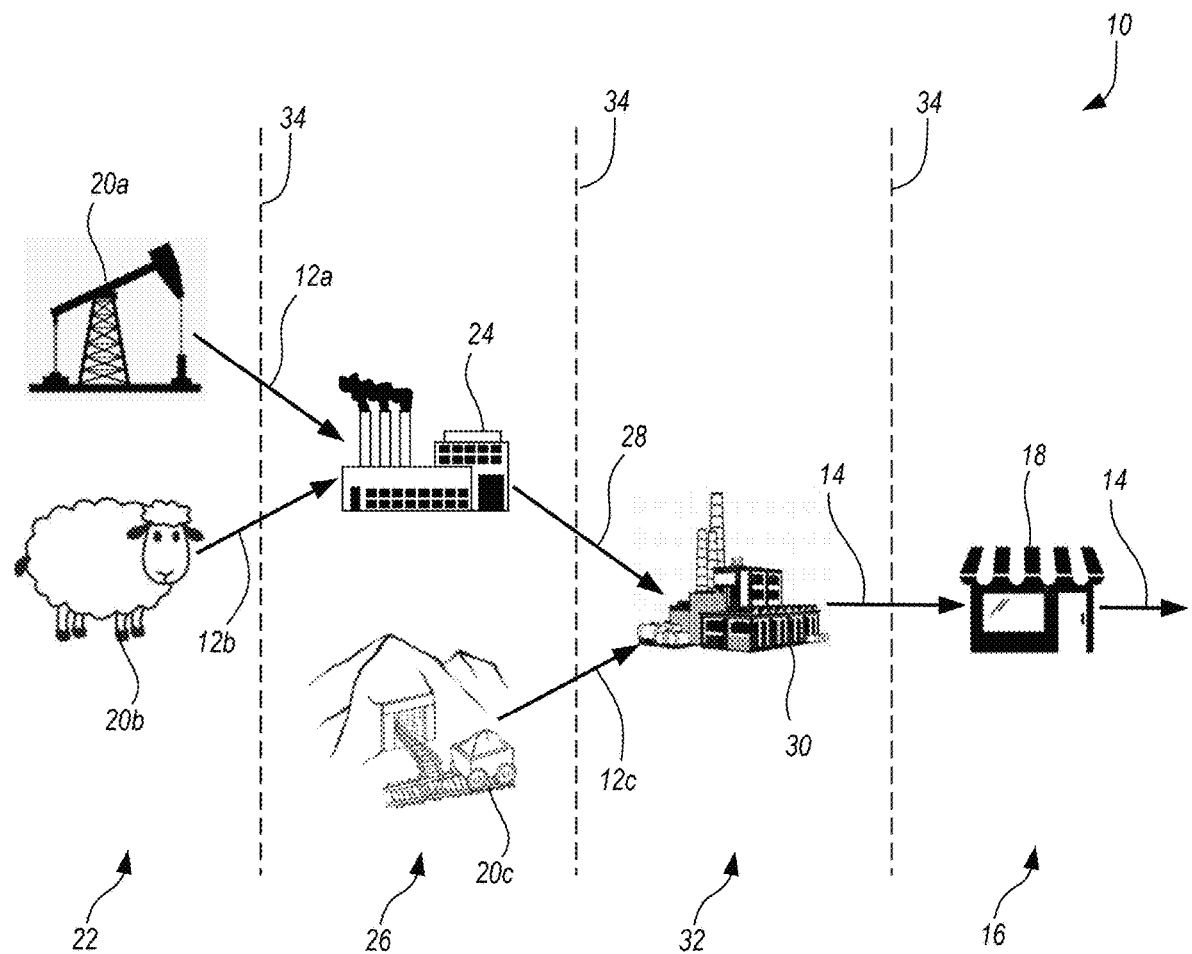
FIG. 1 is a schematic diagram of a manufacturing supply chain in a global marketplace.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

The present technology generally relates to a global trade and SESG management (GTSM) system/platform that serves to streamline and memorialize product documentation throughout the manufacturing and assembly life of a product. In addition to organizing documentation, the present GTSM platform may streamline and assist exporters, importers or downstream manufacturing entities with their data gathering, research, analysis, findings and conclusions (i.e., determinations) necessary to make legally binding certifications, declarations, assertions (collectively, "attestations") that the product satisfies any number of product specific governmental regulations that may exist. If a challenge or governmental audit is ever performed regarding the accuracy of the attestations and thus compliance with regulations, the present system may streamline the audit process by providing trusted instantaneous immutable proof that clearly identifies the basis upon which the determination was made, identifying the deciding party, and pointing to any supporting documentation.

While in some embodiments, the present GTSM platform may be implemented using a generic database architecture, in a more preferred embodiment the present system relies on blockchain technology to immutably record or register data and events associated with the process. Blockchain technology utilizes an append-only form of a distributed ledger that is constructed from an ever-expanding chain of linked blocks. Each block within the chain references the prior block by way of a pointer to the prior block and a cryptographic hash of the data within the block. The hash function is a mathematical function that can convert any variable length input string into a unique, fixed-length output string. Any change to the input string will necessarily result in a change in the output string. As such, a change in a block will affect all subsequent hashes and thus would be immediately detectable. By distributing control over the chain to a plurality of nodes, no one node can create or alter an entry unless there is group consensus that the entry is authentic.

FIG. 1 is provided for context to illustrate the potential complexities inherent in a global marketplace. As shown, FIG. 1 generally provides a high-level illustration of a global manufacturing supply chain 10 where raw materials 12a, 12b, and 12c are converted into a final saleable product 14 that is imported into a destination country 16 by a retailer 18. Along the way, two raw material producers 20a and 20b may be located in a first country 22. They may export their materials 12a, 12b to an intermediate component manufacturer 24 in a second country 26. Using those materials, the intermediate component manufacturer 24 may produce an intermediate component 28 and export that component 28 to a final assembler 30 in a third country 32. The final assembler 30 may likewise combine that intermediate component 28 with a third raw material 12c, sourced from a material producer 20c in the second country 26 to create the saleable product 14.

In this scenario, every time a product crosses an international border 34, there is the possibility that taxes, tariffs, duties and fees are owed to either or both the exporting and importing country, or that the contemporaneous attestations required by an exporting or importing country's regulations must be complied with to make the cross-border movement lawful. Example regulations may, for example, restrict products made using child or forced labor or made from restricted materials such as ivory, certain pharmaceutical compounds, and the like. For the retailer 18 to import an assembled, saleable product 14 into the destination country 16, it is possible that product documentation extending back to the raw materials 12a and 12b may be required despite the retailer possibly not even knowing the identity of the raw material producers 20a and 20b.

FIG. 2 generally illustrates a GTSM system/architecture 40 that may be useful in not only memorializing product documentation throughout the entire manufacturing process but may also serve to make and attest to determinations that a regulatory framework is satisfied or that a product is properly classified within a tariff schedule. The illustrated GTSM architecture 40 largely revolves around the creation and maintenance of unique electronic data records (EDR) 42 by one or more server-class computing devices (generally referenced herein as the "processor 44"). Once created, the processor 44 may make the EDR 42 (and data contained therein) available to one or more users or user devices/systems 48 via a hosted interface 50 (which may permit remote access via a distributed computing network such as the internet 52). Example interfaces 50 may include internet-based portals, websites, mobile apps, application programming interface (APIs), dedicated terminal interfaces, or the like. FIG. 3, which will be discussed in detail below, provides an example internet-based interface 50 that may be made available to a user via a hypertext transfer protocol (HTTP) and displayed on a device 48 local to the user.

In the present system/architecture 40, each EDR 42 may correspond to a product that may be in a sufficiently finished form to be commercially sold. As such, within the present disclosure an EDR 42 may also be referred to as a product record 42. Such "sufficiently finished" products may be either physical or digital and may include, for example, raw materials, refined materials, product components, intermediate assemblies, wholesale finished goods, and/or retail finished goods. When used within the present GTM architecture 40, the EDR 42 may serve as a consolidated brief in support of a regulatory categorization. As used herein, the term "categorization" is intended to encompass both binary categorizations (e.g., whether a free trade agreement applies or whether SESG regulatory conditions are satisfied) and qualitative/quantitative categorizations (e.g., a numeric tariff classification for a particular country).

The processor 44 may be primarily responsible for the creation and maintenance of a plurality of product records 42 within an associated non-volatile memory 60. In some embodiments, the collection of product records 42 may take the form of a database that is stored local to the processor 44 or in an internet-connected "cloud" storage. In more preferred embodiments, however, each EDR 42 may be stored to a public or private blockchain 62 or other append-only immutable distributed ledger. In such an embodiment, creation and maintenance of the record by the processor 44 may involve the processor instructing a node of the distributed ledger to write data to the blockchain.

With continued reference to FIG. 2, in one embodiment, the EDR 42 can generally be divided into four main sections or may contain four general types of data: record-specific data 70; product data 72; component data 74; and categorization data 76. It should be recognized that this structure is meant for illustrative purposes, and one of skill in the art should understand that various specific data constructs may be used to represent the described information.

Record-specific data 70 may generally include any header or bibliographic information relating to the EDR 42 itself. The record data 70 may include a record identifier 80 and record information 82 related to, for example, record ownership, record creation date, the record's location on blockchain, a hash of a prior block on a block chain, a public key/private key signature, or other information that may be regarded as metadata or may otherwise be useful in identifying or structuring the record. In general, the record identifier 80 may be the primary way that the EDR 42 is referenced. For example, a user may be capable of retrieving the EDR 42 and all public information contained therein by entering the record identifier 80 within the hosted user interface 50. In some embodiments, there may be one or more intermediate look up tables accessible by the interface 50 that may convert, for example, an entered Global Trade Item Number (GTIN) or Universal Product Code (UPC) into the record identifier 80.

Product data 72 may generally include information related to the underlying product that the EDR 42 is intended to represent. In one configuration, the product data 72 may comprise summary data 86 that is representative of one or more attributes of the product and one or more pointers 88 or links to supporting data 90 that provide an evidentiary basis for the identified attributes. In general, the summary data 86 may include short-form descriptors that may be useful in understanding the nature or attributes of the product. Such descriptors may include a mixture of qualitative descriptors, product-specific attributes, key ingredients, industry accepted identifiers, tradenames, tracking data, product values, cost, wages, carbon output, specifications, dimensions, packaging, and the like. As generally shown in FIG. 3, the processor 44 may be configured to display some or all of the summary data 86 via the hosted interface 50.

Referring again to FIG. 2, many of the fields contained within the product's summary data 86 may be derived or supported by the supporting data 90 that is not directly stored within the EDR 42 (e.g., off-chain data). Instead of being stored in the EDR 42 itself, due to the potential size of this information it may instead be stored in one or more electronic data repositories 92 that are accessible by the processor 44. In some embodiments, the accessible data repository 92 may be an internet connected database owned and maintained by the manufacturing entity. Examples may include databases associated with inventory systems, engineering systems, and/or accounting systems of one or more companies. In some embodiments, this supporting data 90 may additionally be replicated on a secondary data repository 94 as a means of preserving and cataloging the data for longer term access (i.e., where the secondary data repository itself may be managed by a third party even if access rights are still controlled by the product creator). In some embodiments, APIs (application programming interfaces) may be used/provided to map data from its initial form into a more common form that can be more readily used cross-platform (e.g., XML), which may be saved in addition to the original files in the data repository 94.

Referring again to FIG. 3, in some embodiments, the processor 44 may identify and/or represent the linked supporting data 90 within the user interface 50 in a textual or graphical form. As shown, this may take the form of thumbnail images 96, interactive three-dimensional product renderings, textual descriptions, and the like. In one configuration, each illustrated item may comprise a hyperlink to the underlying source document so that selecting the document will cause the processor 44 to retrieve and display the supporting data 90 referenced by the associated pointer/hyperlink. In some embodiments, the supporting data 90 may include one or more password protected or access-controlled portions, such as, one or more fields, sections, rows, or columns that may require a key or password to view. Such a scenario may serve to protect sensitive data, such as cost data, when entities are reviewing the record after creation. If access is required, in some embodiments, the processor 44 may facilitate the request for the password to unlock the ability to view the protected data. For example, in one embodiment, the processor 44 may provide a requesting party with contact information for the data owner where the request could be made directly. In another embodiments, the processor 44 may serve as an intermediary, where the processor 44 may receive a request for access from a requesting party, may remit this request to a data owner, and upon receiving a grant of access from the data owner, may pass the password or unlocked data on to the requesting party. In one configuration, certain parties, such as registered governmental agents, may have credentialed access to access-restricted data without the need to separately request access. In such an embodiment, access may be granted on a field-by-field basis or may be granted to collections of fields that are grouped together, and may be specified on a user-by-user basis, group basis, or according to predefined "roles."

As may be appreciated, and as is discussed above with respect to FIG. 1, few products in the marketplace are formed with only a single component. Instead, each product may be formed from a plurality of components, each of which may have their own attributes and may be subject to their own trade and SESG regulations, restrictions, taxes and tariffs. To account for this, as shown in FIG. 2, the product record 42 may further comprise component data 74, which may include a component listing 98, and an associated product record pointer 100 that links to a different record identifier 80 and product record 42 for each component. In this manner, a user reviewing a product record for a final product may be capable of drilling down and also reviewing associated records for the entire assembly tree.

With continued reference to FIG. 2, in some embodiments, the product record 42 may further include categorization data 76 that identifies at least one regulatory categorization 102 for the product and includes a digital signature 104 of a party attesting to that regulatory categorization 102. The product record 42 may further include categorization data 76 that identifies at least one regulatory categorization 102 for each component of the product and includes a digital signature 104 of a party attesting to that regulatory categorization 102 for the component(s) of the product.

As noted above, in many instances, the regulatory categorization 102 may be a conclusory and/or categorical determination of the product's standing with respect to a particular governmental regulation, schedule, or construct. Such a determination may be made on the basis of summary data 86 and/or supporting data 90 describing the product, and according to one or more categorization criteria 110 (often written as a statute or regulation). Up-to-date categorization criteria 110 may be made available to the processor 44 via one or more categorization criteria databases 112, which may be maintained by one or more private entities or governmental organizations and may comprise schedules, statutes, regulations, registers, official guidance, and the like. The regulatory categorization 102 may include, for example a binary decision about whether a particular regulation/criteria applies or is satisfied, a supporting categorization from which other regulatory categorizations may be determined, or a selection from a listing/schedule. In some embodiments, the regulatory categorization may be an SESG claim, such as whether the product qualifies according to an established SESG regulation, program, or initiative. An example of a supporting regulatory categorization may include, for example, a determination of a Country of Origin according to one or more Rules of Origin, which may then be used to determine the applicability of a free trade agreement according to separate criteria. Likewise, a selection from a listing/schedule may include, for example, a determination of which harmonized tariff schedule code the product falls within for a particular country. Ultimately, an importer may rely on these conclusory determinations to calculate the amount of duty and/or tax owed, whether, for example, a free trade agreement applies, or if the product may even be exported or imported at all.

Due to the legal ramifications of an improper categorization, it is important that the regulatory categorization 102 be accurate and that the source data underlying the categorization be immutably stored, secured, yet easily accessible (i.e., providing for a streamlined audit process with all documentation at the ready). As such, in some embodiments, the categorization data 76 may further include a data pointer 106 that links to any summary data 86 or supporting data 90 used in the determination. This data pointer 106 may reference fields within the same product record 42 or within different product records or data that may be stored in one or more data repositories that are owned, controlled and operated by one or more entities. In some embodiments, when the categorization is digitally signed, a hash of the underlying data may be taken and stored with the pointer. In this manner, the record may memorialize the state of the summary/supporting documents at the time that the regulatory categorization 102 was attested to.

In some configurations, the processor 44 may compute a probabilistic accuracy metric (i.e., confidence value 108) that indicates a likelihood that the determined categorization 102 is correct/accurate for the given regulations. This metric/value 108 may broadly indicate whether the analysis was clear-cut and definitive, or whether the user should potentially seek additional counsel. Said another way, the metric 108 may generally indicate how definitively the categorization algorithms employed by the processor 44 were able to converge on a single categorization. Once determined, the processor 44 may output this confidence value 108 to a user via the hosted interface 50, and in some embodiments, may further record it to the EDR 42.

In general, the processor 44 may be configured to generate the EDR 42 at the prompting of a user. In some embodiments, product data 72 and component data 74 may be initially sourced from either existing private company product, engineering, and inventory systems, or publicly available data sources, though in many instances the processor 44 may permit a user to review any automatic data extraction prior to the EDR being written to a blockchain or database. In some embodiments, the processor 44 may also understand which categorizations may be required based on the intended use, user, industry, or expected future distribution/sales of the product. In such an instance, the processor 44 may also initiate the categorization process prior to the user review as well. In this manner, if further information is required to make the categorization, the user will see these requests when they enter the record to verify the product and component data 72, 74. In one embodiment, the requests for additional information may be generated by a machine learning algorithm that may learn the types of information required for a product based on the types of information used to generate high confidence categorizations of similar products. Such an adaptive prompting for information may then show a tendency to adapt within a short period of time following changes to the regulatory/legal framework without the need for every market participant to be continually briefed on the law. For example, if a new regulation is implemented that adjusts tariffs based on a net carbon score, then the system may quickly appreciate that attestors are requiring carbon scoring data, and may then push such a request for information to all subsequent parties as part of a set of initial inquiries.

FIG. 4 schematically illustrates a computerized method 200 for determining a regulatory categorization 102, as may be performed by the processor 44. As generally illustrated, the method or process 200 may begin at 202 either when a preliminary regulatory categorization is requested by a user or when the processor 44 has sufficient information about the intended nature and destination of the product to infer that a categorization may be required. Following this, the processor 44 may poll a categorization criteria database 110 and retrieve or receive one or more categorization criteria in response (at 204). The categorization criteria may include one or more schedules with descriptive category identifiers, or regulations that would be deemed to apply if certain criteria are satisfied.

Once the categorization criteria are received, the processor 44 may then examine the existing summary data 86 and any linked supporting data 90 against the categorization criteria in an effort to determine a categorization for the product (at 206). If there is not enough information to arrive at a singular determination (at 208) (i.e., the determination fails), the processor 44 may return to the user (at 210) with a prompt to add new summary or supporting data to the product record. In some configurations, the processor 44 may dynamically adjust the number or nature of the fields/attributes within the summary data 86 based on what is required by the categorization criteria to make a proper categorization.

In one configuration, the processor 44 may attempt the regulatory categorization determination at 206 using decision tree logic, binary classifiers, and/or other supervised or unsupervised machine learning algorithms. In a decision tree structure, for example, the processor 44 may attempt to start from one or more broad categorizations and, through a series of tests or questions, may attempt to funnel down to a single narrow categorization.

In general, with supervised machine learning algorithms, the processor 44 may use past regulatory categorizations to train a model that can be used to make categorizations for future products. For example, if the processor 44 had seen a similar product in the past and that product was categorized in a particular way, the model may consider any similarities/differences with that prior product when classifying the new product. In one configuration, the categorization algorithm maybe further bolstered by the confidence in which prior determinations were made. For example, if a prior determination was confirmed by a tax or customs agent or by a decision of a tax court or court of international trade, then there would be a high confidence that that decision is accurate and would serve as a valuable reference for future products. Conversely, if a regulatory categorization is made by an individual who is not heavily involved in the industry and/or the decision was not challenged by a CBP official, then the prior categorization may bear a lower confidence and should be discounted when extrapolating to future products.

In one configuration a supervised or unsupervised machine learning algorithm may be used in combination with a decision tree algorithm to aid making a categorization and/or in determining whether sufficient information exists from which a categorization may be made. If there is insufficient information for a singular categorization then the algorithm may iterate and generate further questioning or prompt the user for specific information that would be beneficial for a narrower categorization or that would improve the analysis.

If a singular regulatory categorization is achieved (at 212) (i.e., the determination at 206 succeeds), the processor 44 may then compute and/or return a probabilistic estimation of the categorization's accuracy (at 214). The confidence determination may generally account for the sufficiency, creator, ownership and authenticity of the available information, the specificity of the available information, the complexity in arriving at the particular categorization (e.g., the time or number of iterations required to converge on a categorization), the existence of similar categories, the lack of any directly on-point category, the amount of relevant training data, the regulatory categorization of prior products, the confidence in which prior regulatory categorizations were made, the experience of the individuals/entities making prior categorizations, the existence of confirmatory rulings on prior similarly situated products, and the like.

Following this initial determination, and potentially in view of the probabilistic estimation of the categorization's accuracy (i.e., the confidence value), the user maybe prompted (at 216) to sign or attest to the determined regulatory categorization. In some embodiments, prior to the signing at 216, the processor 44 may compare the computed confidence value to a threshold (at 218). If the confidence value is below the threshold, the processor 44 may prompt or encourage the user (at 220) to seek additional counsel. While the user may choose to decline the additional counsel (at 222), if additional counsel is desired (at 224), then the processor 44 may provide and/or facilitate the introduction between the user and one or more third parties via the user interface (at 226), such as shown in FIGS. 5 and 6.

As generally illustrated in FIGS. 5 and 6, the solicited third parties may include one or more third party oracles 150 (shown in FIGS. 1 and 5) and/or one or more third party experts 152 (shown in FIGS. 1 and 6). As used herein an oracle may be a computer implemented database or electronic service that may have its own automated algorithms for determining a product categorization on the basis of summary data and/or source data. While many oracles may exist, it is likely that each uses a different proprietary algorithm in arriving at the determination. For this reason, in some configurations, the processor 44 may enable the user to solicit the opinion/categorization of one or more different oracles, such as shown in FIG. 5.

While oracles are considered to be reliable in most cases, there may be instances where a user would rather consult a live expert. These may include situations where an oracle with relevant knowledge of a particular jurisdiction does not exist, situations where two oracles disagree on the categorization, situations where the oracle disagrees with the processor's initial determination, or based on user preferences for dealing with independent third party human experts. In general, these third party human experts may have identities, credentials (i.e., digital verifiable credentials (such as according to the Verifiable Credentials Data Model 1.0, published by the World Wide Web Consortium, and available at https://www.w3.org/TR/2019/REC-vc-data-model-20191119/) and/or physical credentials (e.g., law degree and license to practice law, licensed customs broker, certified public accountant, etc.)), and/or employers that have been pre-verified, and who can participate in the defense of the categorization if ever challenged. Therefore, in some configurations, such as shown in FIG. 6, the processor 44 may make available a list of third-party experts 152 who have relevant experience with the product, jurisdiction, and/or categorization in question.

In some configurations, the present system may be configured to act as a resource and/or communication channel to facilitate interactions with the oracles and/or experts. More particularly, in preparing a preliminary categorization, the EDR 42 may already contain a wealth of information about the product attributes along with links to supporting data. As such, upon contracting/selecting of the third party, the processor 44 may make the EDR 42 and all information contained therein available to the third party (expert and/or oracle) for their consideration. The system may also then enable the third party to ask additional questions about the user/product, which may be passed back and forth by the processor 44.

Referring again to FIG. 4, following the receipt of one or more regulatory categorizations from consulted third parties (at 228), the processor 44 may attempt to consolidate the one or more received regulatory categorizations together with its own initial determination (at 230). This consolidation may rely on, for example, consensus voting algorithms or structured machine learning algorithms, and may desirably improve the confidence of a particular determination. In one configuration, the voting algorithms may consider the third party's prior experience or established accuracy within a country or field when considering how much reliance to place on their respective category determination.

With reference to FIGS. 5 and 6, in one embodiment, the system may calculate, or each third party may include, one or more accuracy or familiarity metrics, which may aid the user when selecting the third party as well as the processor 44 when consolidating regulatory categorizations. As generally shown, the accuracy/familiarity metrics may include one or more of a product expertise metric and/or a categorization expertise metric. These metrics may, for example, include a number of regulatory categorizations made in a relevant product field, a relevant categorization field, a relevant national jurisdiction, an identification of how frequently the third party reaches consensus with other third parties (in total or within a specific field/jurisdiction), and/or the rate at which the third party is confirmed by a customs official or administrative tribunal (in total or within a specific field/jurisdiction).

Once a determination has been reached on a regulatory categorization, the user may be prompted to sign or attest to the regulatory categorization (as noted above at 216). In one configuration, if a third party is used to make a categorization, and final determined categorization (i.e., an output of the voting algorithm) matches the third party's determination, then the user may request, via the processor 44, that the third-party sign or attest to the categorization.

In one configuration, at the moment the categorization is signed, a snapshot of the EDR 42 may be replicated to an electronically accessible database or data repository (at 232), such as the secondary data repository 94 shown in FIG. 1. This snapshot/replica may then be hashed by a suitable hashing function, and the hash value may be stored on/appended to the EDR 42 along with the electronic signature and the categorization.

In some embodiments, each categorization may be a separate side-chain that is referenced by the EDR 42. In doing so, once signed, the side-chain may be referenced by, or otherwise tokenized such that each downstream product may contain a reference to or token from each attested categorization upstream of that product. FIG. 7 generally illustrates one particular architecture 300 that may be used to deploy the present system 40 as described in FIG. 1. In this structure, the EDR 42 is identified as the KYG Trade Message Set (KYGT.MSG)). The EDR may be embedded, sent and received in any number of programming languages and formats including blockchain smart contracts and tokens. Within this record is product data 72 and one or more pointers 302 to off-chain categorization criteria data 76. For example, the regulatory categorization data 76 may comprise a Harmonized Tariff Schedule (HTS) Side chain (SC) 102*a*, a Country of Origin (Origin) SC 102*b*, a Value SC 102c, and an Export Controls (Export) SC 102d. It should be noted that within this diagram, the term "link" may represent a pointer to one or more external data repositories 92, whereas any text within a box may comprise examples of summary data stored to that discrete record. The abbreviation ETH is intended to represent the Ethereum blockchain network, SaaS denotes a software as a service, BOM denotes a bill of materials, COO denotes a country of origin. Notwithstanding the foregoing, the system is designed as platform agnostic and interoperable with any blockchain network.

Having recorded all product and product component attributes and category attestations, other subsequent users of the system (e.g., other importers, exporters, agents, customs agencies, etc.) can view the Product's categorizations with trust and confidence in said determinations and the source documents supporting the determinations. In this regard, subsequent users who need to obtain the same Product's categorization determinations may rely on the system and source documentation, rather than redundantly repeating the categorization process from start to finish and storing their results in their own siloed system. This applies for the same Product (as defined by its GTIN, UPC, etc.) that is exported from or imported to any jurisdiction by any exporter or importer of record and simultaneously complies with said jurisdictions record keeping and reasonable care requirements.

In this regard, the system represents a democratized self-governing decentralized tax, trade and SESG attestation platform that learns and evolves with each use, new products added, new technologies, and changes in regulations, and can be trusted by all participants.

A non-limiting list of current SESG claims/programs/initiatives include, but are not limited to: 1% for the Planet; Aenor Estrategia Sostenible (ODS); American Tree Farm System (ATFS); B Corp; blueSign; Bureau Veritas World Goals Certificate; Cradle to Cradle Certified; Downpass; Electronic Product Environmental Assessment; Energy Star; Fair Trade Certified; Forest Stewardship Council Certification; Global Organic Textile Standard; No Forced Labor; OECD Conflict Mineral Attestation; and Sustainable Forest Initiative (SFI). For the purpose of this application, a claim made that a product satisfies the requirements of one of these (or other) SESG programs/initiatives/certifications can be logically separated from the specific requirements of the program/initiative/certification itself.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and sub-combinations of the preceding elements and features.

Additional features, use cases, and supplemental disclosure are provided in the appendix to the present application.

What is claimed:
1. A global trade management system, comprising:
a memory device storing product records;
a processor in electronic communication with the memory device and a data repository storing product data for a physical product, the processor being configured to:
receive, from a remote computing node, tracking data indicative of a request to move the physical product across an international border of a country, the country having a trade statute or regulation including regulatory product categorizations;
generate, responsive to receiving the tracking data, an electronic data record (EDR) corresponding to the physical product, the EDR being stored in the memory device associated with the processor and comprising:
a record identifier;
summary data representative of one or more attributes of the physical product; and
an electronic pointer identifying the location of the product data on the data repository;
determine, from the regulatory product categorizations in the trade statute or regulation, a regulatory cat- egorization for the physical product based on the summary data and/or the product data;

determine a confidence value for the regulatory categorization, wherein the confidence value is indicative of a likelihood that the determined regulatory categorization for the physical product is a most optimal categorization according to one or more categorization criteria;

output the confidence value to a user via an interactive graphical user interface (GUI), the interactive GUI including an interactive three-dimensional (3D) product rendering located at a first position and containing a pointer or hyperlink to an underlying source document such that selecting the interactive 3D product rendering automatically retrieves and displays the underlying source document referenced by the associated pointer or hyperlink at a second location on the interactive GUI;

enable the user to search for, retrieve, and manipulate the EDR using the interactive GUI; and append the EDR with the determined regulatory categorization.

2. The global trade management system of claim 1, wherein the processor is further configured to instruct the EDR to be written to a blockchain via a blockchain record including a record location, a transaction hash function, and a public key.

3. The global trade management system of claim 1, wherein the EDR further comprises:

an indication of one or more components of the physical product; and an electronic pointer identifying a different record identifier for each of the one or more components, wherein each component of the one or more components has its own EDR.

4. The global trade management system of claim 1, wherein the processor is in electronic communication with one or more categorization criteria databases each having stored therein the one or more categorization criteria; the processor further configured to determine the regulatory categorization for the product according to the one or more categorization criteria stored within the categorization criteria database.

5. The global trade management system of claim 4, wherein the processor is configured to determine the regulatory categorization for the product using a supervised machine learning algorithm.

6. The global trade management system of claim 4, wherein the regulatory categorization includes a country of origin, an SESG claim, a trade agreement compliance determination, a tariff classification, an export controls determination, and/or a customs value determination.

7. The global trade management system of claim 1, wherein the processor is configured to determine the regulatory categorization for the product by:

electronically transmitting the summary data and either the electronic pointer or the product data to a third-party computing node; and receiving the regulatory categorization from the third-party computing node.

8. The global trade management system of claim 7, wherein the third-party computing node is an electronic oracle or an electronic account associated with a category expert.

9. The global trade management system of claim 8, wherein the processor is further configured to:

present a user with one or both of a listing of category experts or a listing of electronic oracles;

receive an input from the user corresponding to a selected category expert or electronic oracle; and electronically transmit the summary data and either the electronic pointer or the product data to the selected category expert or electronic oracle.

10. The global trade management system of claim 8, wherein the processor is configured to maintain a rating for each category expert in the listing of category experts, the rating comprising one or more qualitative or quantitative metrics.

11. The global trade management system of claim 10, wherein each of the quantitative metrics includes an accuracy score and/or a number of regulatory categorization determinations made by the category expert.

12. The global trade management system of claim 1, wherein the processor is in electronic communication with a categorization criteria database and a third-party computing node, the processor being further configured to:

determine a first preliminary regulatory categorization for the product according to a regulatory categorization criteria stored within the categorization criteria database and using a supervised machine learning algorithm;

electronically transmit the summary data and either the electronic pointer or the product data to the third-party computing node;

receive a second preliminary regulatory categorization from the third-party computing node; and determine the regulatory categorization for the product from the first preliminary regulatory categorization and the second preliminary regulatory categorization.

13. The global trade management system of claim 12, wherein the regulatory categorization includes a country of origin, an SESG claim, a trade agreement compliance determination, a tariff classification, an export controls determination, and/or a customs value determination.

14. The global trade management system of claim 12, wherein the processor is further configured to append a digital signature to the regulatory categorization, the digital signature belonging to a user who approves the determined regulatory categorization and/or one of the third-party computing node.

15. The global trade management system of claim 12, wherein the processor is configured to determine the confidence value for the regulatory categorization by analyzing the similarity between the first preliminary regulatory categorization and the second preliminary regulatory categorization.

16. The global trade management system of claim 1, wherein the summary data comprises a plurality of attribute fields, and wherein the processor is further configured to adjust the number or type of attribute fields based on one or more of a categorization criteria or the product data.

17. The global trade management system of claim 1, wherein the processor is further configured to:

generate a cryptographic hash of the product data; and append the cryptographic hash to the EDR.

18. The global trade management system of claim 1, wherein the one or more attributes of the product comprise one or more of a product weight, a product dimension, a product color, a product size, a carbon offset factor, a labor cost for creating the product, or a research and development expenditure.

19. The global trade management system of claim 1, wherein the interactive GUI includes one or more intermediate look-up tables selectable by the user and operable to automatically convert an entered Global Trade Item Number (GTIN) or Universal Product Code (UPC) into the record identifier such that entering the GTIN or UPC into the interactive GUI automatically retrieves and displays the EDR associated with the record identifier.

20. The global trade management system of claim 1, wherein the interactive GUI is operable to map the EDR from a first data format to a second data format, and replicate the EDR in the second data format on a secondary data repository.

21. The global trade management system of claim 12, wherein determining the first preliminary regulatory categorization for the physical product according to the regulatory categorization criteria includes the supervised machine learning algorithm generating multiple information requests based on learned types of information required for the physical product based on related types of information used to generate high-confidence categorizations of products similar to the physical product.

22. The global trade management system of claim 1, wherein the processor is further configured to determine, using a supervised or unsupervised machine learning algorithm in combination with a decision tree algorithm, whether or not sufficient information exists from which the regulatory categorization may be determined.

23. The global trade management system of claim 1, wherein determining the confidence value for the regulatory categorization includes a supervised machine learning algorithm consolidating the first and second preliminary regulatory categorizations together with an initial categorization determination generated by the supervised machine learning algorithm to thereby increase the confidence value determination.

24. A global trade management system, comprising:
a memory device storing product records;
a processor communicatively connected to the memory device and a data repository storing product data for a physical product, the processor being configured to:
receive, from a remote computing node, tracking data indicative of a request to move the physical product across an international border of a country, the country having a trade statute or regulation including regulatory product categorizations;
generate, upon receipt of the request to move the physical product across the international border, an electronic data record (EDR) for the physical product, the EDR comprising:
a record identifier;
summary data representative of one or more attributes of the physical product; and
an electronic pointer identifying the location of the product data on the data repository;
store the EDR in the memory device;
determine, from the regulatory product categorizations, a regulatory categorization for the physical product based on the summary data and/or the product data, the determining the regulatory categorization including:
determining, using a supervised machine learning algorithm, a first preliminary regulatory categorization for the product according to a regulatory categorization criteria stored within a categorization criteria database;
transmitting the summary data with the electronic pointer and/or the product data to a third-party computing node;
receiving a second preliminary categorization from the third-party computing node; and
determining the regulatory categorization from the first preliminary regulatory categorization and the second preliminary regulatory categorization;
determine a confidence value for the regulatory categorization indicative of a likelihood that the regulatory categorization for the physical product is a most optimal categorization according to one or more categorization criteria, wherein the processor determines the confidence value for the regulatory categorization using a decision tree that weights the first preliminary regulatory categorization and the second regulatory preliminary categorization according to a product expertise metric and/or a categorization expertise metric;
append the EDR with the regulatory categorization; and
enable the user to search for, retrieve, and manipulate the EDR using an interactive graphical user interface (GUI), the interactive GUI including an interactive three-dimensional (3D) product rendering located at a first position and containing a pointer or hyperlink to an underlying source document such that selecting the interactive 3D product rendering automatically retrieves and displays the underlying source document referenced by the associated pointer or hyperlink at a second location on the interactive GUI.

25. A global trade management system, comprising:
a memory device storing product records;
a processor communicatively connected to the memory device and a data repository storing product data for a physical product, the processor being configured to:
receive, from a remote computing node, tracking data indicative of a request to move the physical product across an international border of a country, the country having a trade statute or regulation including regulatory product categorizations;
generate, upon receipt of the request to move the physical product across the international border, an electronic data record (EDR) for the physical product, the EDR comprising:
a record identifier;
summary data representative of one or more attributes of the physical product; and
an electronic pointer identifying the location of the product data on the data repository;
store the EDR in the memory device;
create a blockchain record to register the EDR to a decentralized blockchain ledger, the blockchain record including a record location, a transaction hash function, and a public key, wherein the processor is in electronic communication with the data repository via the blockchain record;
determine, from the regulatory product categorizations, a regulatory categorization for the physical product based on the summary data and/or the product data;
determine a confidence value for the regulatory categorization, wherein the confidence value is indicative of a likelihood that the determined regulatory categorization for the physical product is a most optimal categorization according to one or more categorization criteria;
append the EDR with the regulatory categorization; and
enable the user to search for, retrieve, and manipulate the EDR using an interactive graphical user interface (GUI), the interactive GUI including an interactive three-dimensional (3D) product rendering located at a first position and containing a pointer or hyperlink to an underlying source document such that selecting the interactive 3D product rendering automatically retrieves and displays the underlying source document referenced by the associated pointer or hyperlink at a second location on the interactive GUI.

\* \* \* \* \*